UNITED STATES PATENT OFFICE.

LOUIS ENRICHT, OF NEW YORK, N. Y., ASSIGNOR TO THE ENRICHT MANUFACTURING COMPANY, OF SAME PLACE.

MANUFACTURE OF DECORATIVE RELIEF MATERIAL.

SPECIFICATION forming part of Letters Patent No. 449,874, dated April 7, 1891.

Original application filed December 24, 1888. Serial No. 294,537. Divided and this application filed May 6, 1889. Serial No. 309,798.

(No specimens.)

*To all whom it may concern:*

Be it known that I, LOUIS ENRICHT, of the city and State of New York, have invented a new and useful Process in the Manufacture of Decorative Relief Material, of which the following is a full and exact specification.

My invention relates to the class of plastic material which is used for purposes of decoration in relief, the present application being a division of my application filed in the United States Patent Office December 24, 1888, having the serial number 294,537.

In carrying out my invention I proceed as follows: I dissolve a sufficient quantity of alkali in water which has been heated to the boiling-point. The alkali which I use by preference is pearlash (the neutral carbonate of potassium $K_2CO_3$) in the proportion of one pound of pearlash to five gallons of water. While the alkaline solution is receiving a brisk and continuous stirring I add a quantity of the ordinary commercial resin in the proportion of about one pound of resin to one gallon of the alkaline solution. After the resin has melted in the boiling solution the compound is removed from the fire, and while being constantly stirred a quantity of ammonia-liquor containing twenty-six per cent. of ammonia is added, equal in weight to the quantity of pearlash used in the preparation of the alkaline solution. If the strength of the ammonia-liquor is less than twenty-six per cent., a proportionately larger quantity must be added in order to produce the desired result. By these means I am enabled to produce a resin solution which forms one of the ingredients of my compound. With this resin solution I mix a paste formed of vegetable gluten, sulphate of calcium, carbonate of calcium, and water. The gluten, the sulphate of calcium, and the carbonate of calcium are pulverized and mixed with a sufficient quantity of water to produce a mass of the consistency of ordinary paste, and the proportion in which the various ingredients may be used is about as follows: gluten, twenty-six parts, by weight; carbonate of calcium, eighteen parts, by weight, and sulphate of calcium thirty-eight parts. The paste produced by these means is mixed with the resin solution heretofore described in about the proportion of eighty-two parts of the paste to eighteen parts of the resin solution. By the intimate mixture of these ingredients my new decorative relief material is obtained. It has the advantages over previously-known relief material that it is inexpensive, durable, tough, practically fireproof, as impervious to water as hydraulic cement, and easily applied to use.

This decorative relief material may be molded into any desired ornamental shape or applied to wall or ceilings, and when it is exposed to the air it becomes exceedingly hard.

The proportions of the several ingredients and compounds above given will produce relief material adapted to a large range of work, such as the decoration and ornamentation of walls, ceilings, furniture, frames, &c., and for the manufacture of statuary, fancy ornaments, plaques, advertising-signs in relief, &c., and in general all objects and purposes for which plastic composition may be employed; but I do not limit myself to the precise proportions above named, as they can be varied within the scope of my invention—as, for instance, the quantity of sulphate of calcium used can be increased and the quantity of gluten and resin solution lessened, whereby a mixture is produced which dries more rapidly than that above given, and it is obvious that a reversal of such changes in the proportions will operate in a reverse direction.

What I claim as new, and desire to secure by Letters Patent, is—

1. The process of manufacturing a plastic material, which consists in dissolving an alkali, such as pearlash, in boiling water, adding resin thereto, treating the same with ammonia, and adding thereafter gluten, sulphate of calcium, carbonate of calcium, and water in the proportions and manner substantially as above described.

2. In the manufacture of a plastic material, the process of preparing a solution of resin in water, which consists in dissolving an alkali, such as pearlash, in boiling water, adding resin thereto, and treating the same with ammonia, so as to produce a resin solution, substantially as described.

LOUIS ENRICHT.

Witnesses:
L. M. GREENE,
WALTER T. WILSON.